United States Patent [19]

Rich et al.

[11] Patent Number: 4,801,365
[45] Date of Patent: Jan. 31, 1989

[54] METHOD FOR ENRICHING A MIDDLE ISOTOPE USING VIBRATION-VIBRATION PUMPING

[75] Inventors: Joseph W. Rich, East Aurora; Gregory F. Homicz, Getzville; Richard C. Bergman, Corfu, all of N.Y.

[73] Assignee: The United States of American as represented by the United States Department of Energy, Washington, D.C.

[21] Appl. No.: 670,523

[22] Filed: Nov. 13, 1984

[51] Int. Cl.[4] .............................................. B01D 59/34
[52] U.S. Cl. ............................ 204/157.22; 204/157.2; 204/157.21; 423/2
[58] Field of Search ........... 204/157.2, 157.21, 157.22; 423/2

[56] References Cited

U.S. PATENT DOCUMENTS

| | | | |
|---|---|---|---|
| 4,092,405 | 5/1978 | Von Rosenberg, Jr. et al. | 204/157.21 |
| 4,142,955 | 3/1979 | Rich et al. | 204/157.22 |
| 4,163,199 | 7/1979 | Treanor | 372/35 |

OTHER PUBLICATIONS

S. O. Macheret et al., Dokl. Akad. Nauk SSSR 255, 98-102 (Nov. 1980), Am. Inst. of Physics 1981.
"$C_2$ and CN Formation by Optical Pumping of CO/Ar and CO/$N_2$/Ar Mixtures at Room Temperture", J. William Rich and Richard C. Bergman, Chemical Physics, vol. 44, No. 1, Nov. 15, 1979.
"Vibrational Relaxation of Anharmonic Oscillators with Exchange-Dominated Collisions", C. E. Treanor, J. W. Rich and R. G. Rehm, The Journal of Chemical Physics, vol. 48, No. 4, Feb. 15, 1968.
"Isotope Effect in the Kinetics of Nonequilibrium Plasmochemical Reactions", S. O. Macheret, V. D. Rusanov, A. A. Fridman and G. V. Sholin, Sov. Phys. Dokl. 25 (11), Nov. 1980 (1981 American Institute of Physics).
"9. Isotope Separation by Vibration-Fibration Pumping", J. W. Rich and R. C. Bergman, Nonequilibrium Vibrational Kinetics, Topics in Current Physics, vol. 39 (M. Capiltelli, Editor), published by Springer-Verlag, Berlin, 1986.

Primary Examiner—John F. Terapane
Assistant Examiner—Virginia B. Caress
Attorney, Agent, or Firm—Arthur A. Churm; Judson R. Hightower

[57] ABSTRACT

Method for producing isotopically enriched material by vibration-vibration excitation of gaseous molecules wherein a middle mass isotope of an isotopic mixture including lighter and heavier mass isotopes preferentially populates a higher vibrational mode and chemically reacts to provide a product in which it is enriched. The method can be used for vibration-vibration enrichment of $^{17}O$ in a CO reactant mixture.

8 Claims, 2 Drawing Sheets

METHOD FOR ENRICHING A MIDDLE ISOTOPE USING VIBRATION-VIBRATION PUMPING

BACKGROUND OF THE INVENTION

The present invention relates to isotope separation and enrichment and, more particularly, to a method wherein a molecular mixture containing at least 3 isotopes is vibrationally excited and induced to chemically react and provide a product in which the middle mass isotope is enriched.

It is well-known that very high energy vibrational quantum states of some molecular gases can be substantially populated under specific nonequilibrium conditions by the mechanism of vibration-vibration (V-V) exchange pumping. This kinetic mechanism is automatically operative in high pressure, collision-dominated gases wherever a sufficiently large amount of energy can be put into the vibrational mode of a gas molecule, while, simultaneously, a low gas kinetic (translational/rotational mode) temperature is maintained. The vibrational energy state population distribution in such cases is highly non-Boltzmann and characterized by relative overpopulation of the higher, anharmonic, vibrational quantum states with respect to the lowest vibrational states. This type of nonequilibrium vibrational population distribution is creaeted by vibration-vibration (V-V) inelastic collisions between the gas molecules, in which quanta of vibrational energy are exchanged by the anharmonic vibrational modes of the collision partners. This process is the major inversion mechanism in electrically excited, infrared carbon monoxide lasers.

Methods for enriching selected isotopes based on vibration-vibration pumping are known in the art. In these methods, an isotopic mixture is subjected to excitation radiation which causes the heavier molecular weight isotopes to assume higher vibrational energy levels. Although the difference in molecular weight is small, there is a significant difference in the degree of vibrational excitation of the isotopes. As a result, the heavier isotopes preferentially dissociate or otherwise preferentially react to produce a product in which the heavier isotope is more concentrated.

U.S. Pat. No. 4,142,955 to Rich et al teaches a method for enriching isotopes where an isotopic mixture of gases is irradiated with a pump laser which produces radiation capable of resonant absorption by at least one species of the mixture. That species populates the higher vibrational states by vibration-to-vibration pumping. In one embodiment, the mixture of gases contains carbon monoxide which dissociates and forms $C_2$ that is isotopically enriched in $C^{13}$.

U.S. Pat. No. 4,092,405 to von Rosenberg, Jr. et al discloses a method for separating deuterium from hydrogen wherein hydrogen containing its natural abundance of deuterium is supplied to a reaction vessel with a reactant such as bromine. In the reaction vessel, the hydrogen and deuterium are vibrationally excited such that vibration-vibration energy pumping occurs from which follows chemical reactions that produce HBr and DBr at such relative rates that the mixture is enhanced in deuterium content. Vibrational excitation is accomplished through an ionization sustained, electrical discharge.

The aforementioned methods are effective in separating the heavier isotope or isotopes in an isotopic mixture. A method known as the "inverse isotope effect," described by Marcheret et al, "Isotope Effect in the Kinetics of Nonequilibrium Plasmochemical Reactions," *Sov. Phys. Dokl.* 25, 925 (1980) is useful in enrichment of lighter isotopes. In this method, the lighter isotope pumps to higher vibrational levels and predominantly enters into reaction. Thus, means for preferentially separating the heavy and light isotopes from a mixture via vibration-vibration pumping are reported in the literature.

SUMMARY OF THE INVENTION

The present invention relates to a process for separating the middle mass isotope from a ternary isotopic mixture using the inverse isotope effect. In accordance with the invention, an isotopic mixture such as a mixture of $C^{16}O$, $C^{17}O$, and $C^{18}O$, is vibrationally excited by, for example, resonance absorption of radiation from a c.w. CO laser. The irradiation must occur while simultaneously maintaining a relatively low gas translational mode temperature. Such a low gas translational mode temperature is maintained by conventional cooling techniques. This cooling can be convective, i.e., achieved by flowing the gas mixture through the irradiation zone, or conductive, i.e., achieved by the natural transport of heat through the gas to the cooled walls of the containing vessel.

Under such conditions of simultaneous irradiation and cooling, a range of certain specific higher energy vibrational quantum states will be preferentially populated by the middle mass isotopic species. This preferential population is such that the ratio of the population of a state in this range to the population of the lowest energy quantum state will be higher for the middle mass isotope, than the corresponding population ratios in the other two isotopic species. Over this range of vibrational energies, the gas mixture is preferentially enriched in the middle mass isotopic species. The vibrational energy range over which the middle mass isotope's vibration-to-vibration (V-T) quenching rate.

In accordance with one manifestation of the invention, by irradiating under conditions at which the V-T rate is high, the disparity in the isotope populations can be increased (at lower vibrational energies) and the enrichment can be enhanced.

In accordance with the present invention, middle isotope separation is accomplished by controlling the extent of the V-V pump plateau in the vibrational population distribution. It has been found that there are certain vibrational energies, at which the middle mass isotope in a ternary isotopic mixture pumps to higher vibrational levels (quantum numbers) than the lighter and heavier isotopes. This effect is created by the difference in the V-V exchange rates which sustain the pumping. The disparity in the V-V rates increases as the molecular mass difference increases. The V-V pumped plateaus are sustained up to a vibrational level corresponding to some energy value for which the near resonance V-V pumping rate exceeds the vibration-to-translation, rotation (V-T,R) quenching rate. The (V-T,R) rates exhibit only a relative slight dependence on mass. As such, in an isotopic mixture such as $C^{16}O$, $C^{17}O$, and $C^{18}O$, the lightest isotope, $C^{16}O$, with the fastest V-V rate pumpss to higher quantum numbers before the V-T,R rate ends the process. The V-V pumped plateau for the heaviest isotope, $C^{18}O$, ends at the lowest energy level and the V-V plateau for $C^{17}O$ terminates at an intermediate level. Thus, there is a range of vibrational energy at which the middle isotope is the more populous at the higher energy levels and the middle isotope will preferentially enter reactions which occur with an activation energy in this range enabling its enrichment.

The present invention is advantageous in that:

(i) it is selective for the middle mass isotope, without requiring low density (near collision-free conditions) to maintain selectivity; (ii) it does not require laser excitation; and (iii) the very steep concentration gradients among the reactant components in the region of the reaction activation energy suggest that quite large $C^{17}O$ enrichment ratios are attainable.

Thus, the present invention provides a method for producing isotopically enriched material by vibration-vibration excitation of gaseous molecules in which at least one element is present as first, second, and middle isotopes, the middle isotope having molecular mass greater than the first isotope and less than the second isotope, wherein said method comprises vibrationally exciting the molecules such that the vibration-vibration exchange rates of at least said molecules containing the middle isotope exceed the vibration-translation, rotation quenching rate;

cooling the gas to maintain a low translational mode temperature;

chemically reacting the vibrationally excited molecules in a reaction which preferentially occurs at a vibrational quantum level at which a higher population of the molecules containing the middle isotope pumps to higher vibrational modes than molecules containing the first and second isotopes; and collecting the product of said reaction.

BRIEF DESCRIPTION OF THE DRAWINGS

The present invention will be illustrated in more detail by reference to the following drawings wherein.

DETAILED DESCRIPTION OF THE INVENTION

The method of the present invention is herein described with reference to the use of laser optical pumping for vibrational excitation, however, various other modes of vibrational excitation including electric discharge and thermal excitation followed by supersonic expansion could also be used. Furthermore, while reference is made herein to a method in which CO is vibrationally excited by resonance absorption of radiation from a c.w. CO laser, it is not necessary that the lasant species and the pumped species be the same. The resonant absorption of the pump laser radiation by the reacting species is the controlling factor.

Figure 1:
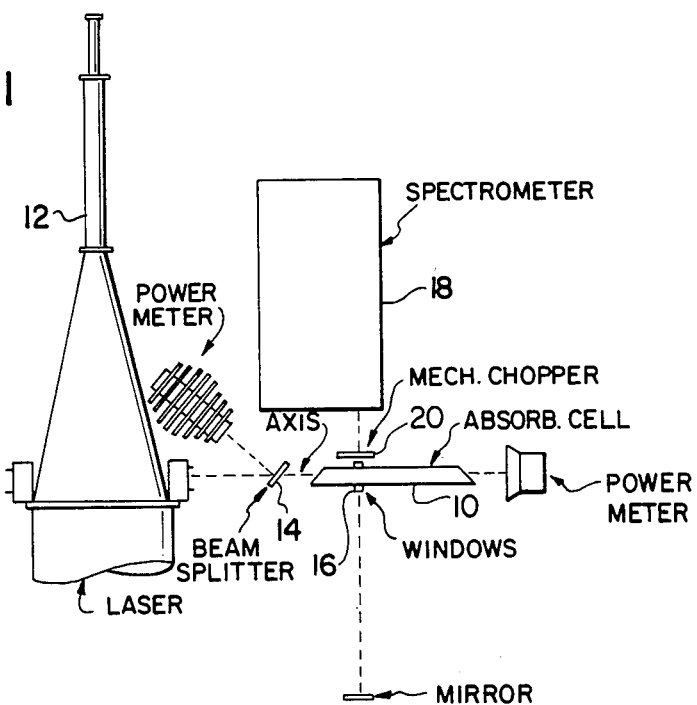
FIG. 1 is a schematic representation of an experimental set up for optical pumping of CO.

A typical experimental setup for optical pumping of CO is shown schematically in FIG. 1. Premixed carbon monoxide and argon flow thorugh the 25 cm long absorption cell 10. Radiation from an electrically excited supersonic flow c.w. carbon monoxide laser 12 is admitted along the longitudinal axis of the cell 10 through a calcium fluoride beam splitter 14; the beam diameter nearly fills the 0.95-cm cell diameter. The degree of absorption of the laser beam by the gases is determined by measuring the power incident upon and transmitted through the cell using thermopiles. The call is equipped with calcium flouride windows 16 along its length to permit spectroscopic monitoring of carbon monoxide vibrational excitation and other fluorescence from excited species. The pump laser radiation is absorbed by the lower vibrational states of the carbon monoxide in the cell. The vibration-to-vibration (V-V) pumping mechanism described above quickly populate the upper vibrational states of the pumped CO. The temperature of the translational and rotational modes of the pumped gases is maintained at a low value in steady state by the gas flow through the cell. By this means, a higher vibrational energy per CO molecule is achieved in the cell than is typical of the pumping achieved in electrically or chemically, excited CO lasers. Details of the performance of such cells, and CO pumping experiments performed in them, have been published. See, for example, Rich et al, *Gas-Flow and Chemical Lasers*, ed. J. F. Wendt, pp 181–190, Hemisphere Publishing Co., (1979) and Rich et al, *Chem. Phys.* 44, 53 (*1979*).

To determine the details of the CO vibrational excitation, a ¾ meter scanning monochromator 18 is used to record spontaneous infrared overtone emission from the side windows 16 of the cell. The CO first overtone IR band (2–3 μm) system is usually used as the diagnostic since the call gases are optically thin on this band. To records pontaneous infrared emission from the side windows 16 of the cell, the mononchromator 18 is equipped with a 300 line/mm optical grating, blazed at 4 μm, and an InSb liquid-nitrogen-cooled photovoltaic detector. The radiative signal into the monochromator is interrupted with a synchronuous-motor-driven chopper 20, driven at 800 hertz. Chopped output from the detector is amplified by a Princeton Applied Research Corporation Model 124 phase-sensitive amplifier, and the amplified signal is recorded on a Varian Corporation Model 2400 chart recorder; an advantage of the steady-state nature of the experiment is that such phase-sensitive amplification methods can be used. The monochromator is evacuated. The relative amplitude response of the system is determined in standard fashion by scanning a calibrated black body source. Argon diluent provides a high degree of convective cooling of the test gases, maintaining translational-rotational temperature near 300° K.

Figure 2:
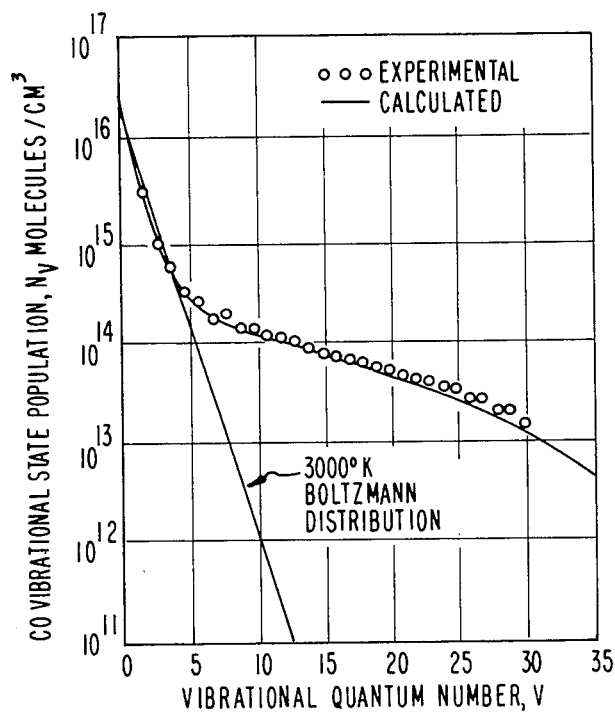
FIG. 2 is a vibrational state population distribution for vibration-vibration pumped CO.

An example of a typical V-V pumped distribution is given in FIG. 2. This is a vibrational state population distribution in CO, measured in the 1 cm diameter discharge tube of working electrically-excited laser. In this case, energy is supplied to the CO vibrational mode by inelastic collisions with the electrons of the laser's electric discharge; however, the same type of distribution would be obtained with optical pumping. The gas translation-rotational temperatuer is maintained near 150° K. by wall coloring of the discharge tube. The extreme nonequilibrium nature of the vibrational population distribution is apparent. The total energy in the vibrational mode is about 0.25 eV per CO molecule. If this energy were distributed in a Boltzmann distribution of vibrational state populations, it would correspond to a vibrational temperature of approximately 3000° K.; such an equivalent-energy population distribution is also shown in FIG. 2. It is important to note that the equilibrium distribution does not predict significant populations of high vibrational energy levels. For example, at V=30, the equilibrium distribution shows a population of less than 20 molecules/cm³, while the actual V-V pumped distribution shows this level to have a population in excess of $10^{13}$ molecules/cm$^3$. Indeed, it is among the highly populated states from about 7 to 30, in the long, plateau-like region of the distribution, that partial population inversions create CO laser action on the $\Delta V=1$ and $\Delta V=2$ infrared transitions.

Figure 3:
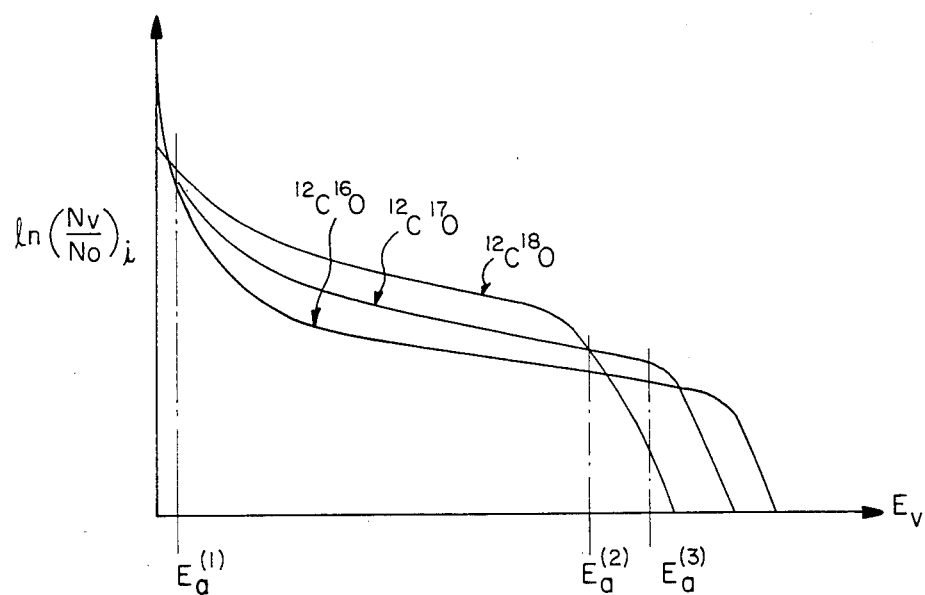
FIG. 3 is a vibrational population distribution function for a $^{12}C^{16}O$, $^{12}C^{17}O$, $^{12}C^{18}O$ system.

With the present process, middle isotope separation is accomplished by control of the extent of the V-V pump plateau in the vibrational population distribution. FIG. 3 shows the qualitative features of such distributions to be expected in a V-V pumped mixture of $^{12}C^{16}O$, $^{12}C^{17}O$, and $^{12}C^{18}O$. The symbol $(N_v/N_0)_i$ is the ratio of the number of molecules of species i in the quantum level v to the number of molecules of species i in the 0 quantum level where i is the particular species, i.e., $C^{12}O$, $C^{13}O$, or $C^{14}O$. As FIG. 3 indicates, the heavier isotopic species V-V pumps to a relatively higher population in the plateau region, $E_a^{(1)} < E < E_2^{(2)}$. Thus if the V-V pumped CO chemically reacts with an activation energy between $E_a^{(1)}$ and $E_2^{(2)}$ the products will be preferentially enriched in heavier isotopes, the separation factor being greatest for the heaviest species ($^{12}C^{18}O$ in the mixture chosen for the example). This is the more common enrichment effect created by V-V pumping.

In contrast to the above, the condition giving preferential middle mass $^{17}O$ enrichment is that for which the activation energy is $E_a^{(3)}$. As FIG. 3 shows, the V-V pumped plateaus for the various components begin to fall off at different energies ($E_v$). The plateau for the heaviest component ends at the lowest vibrational energy. This effect is created by the differences in the V-V exchange rates which sustain the pumping of the three plateaus.

The plateau in the abundant isotope, $C^{16}O$ in the example, is maintained by near-resonance V-V exchange collisions among the $C^{16}O$ molecules. In the case of the heavier isotopes, however, their plateaus are sustained by V-V exchange collisions between the heavy isotope molecules and the more abundant $C^{16}O$ molecules. For any initial vibrational quantum state, the V-V processes are less resonant than the corresponding V-V exhange between two $C^{16}O$ molecules, and, accordingly, the V-V pumping rate is slower. This disparity in V-V rates increases as the molecular mass difference increases, making the V-V rates for $C^{18}O$–$C^{16}O$ exchanging the smallest in the example.

As is well-known, the V-V pumped plateaus are sustained up to a vibrational level, corresponding to some value of $E_v$, for which the near-resonance V-V pumping rate no longer exceeds the local vibration-to-translation, rotation (V-T,R) quenching rate. Since the V-T,R rates only exhibit a relatively slight dependence on the changes in mass for $C^{16}O$, $C^{17}O$, and $C^{18}O$, the situation shown in FIG. 3 arises, in which the abundant light isotope, $C^{16}O$, with the fastest V-V rates, pumps to higher quantum numbers before the V-T,R rate ends the process. The heaviest isotope, $C^{18}O$, has its V-V pumped plateau ending at the lowest $E_v$ of the three components, since its local V-V rate is slowest. The $C^{17}O$ plateau termination is intermediate. As indicated above, this feature of V-V pumping, in which the lighter isotope pumps to higher levels, has been noted by Macheret et al. However, in that study, the effect is only examined as a means of enriching the lighter isotopic species in a binary mixture, not as a means of separating one or more of the middle mass isotopes in a system of three or more isotopic species.

The V-V pumped CO reacts to form C, $C_2$, $CO_2$ and $C_3O_2$ products. Ordinarily, these products would be enriched in the heavier, $C^{18}O$ isotope as a function of the preferential vibrational excitation of the heavier isotope. In the present invention, however, by reacting at activating energies in which the middle isotope is more active, a higher concentration of the $C^{17}O$ isotope is obtained.

It is well known that vibrationally excited CO reacts to form C, $C_2$, $CO_2$ and $C_3O_2$ products. This reaction sequence has been studied in electric discharge excited and radiation excited CO gas by many researchers. The activation energy for this reaction is approximately $E_a = 5.5$ eV, an energy corresponding to the 27th vibrational quantum level of $C^{16}O$. In most circumstances when isotopic mixtures of CO are vibrationally excited by V-V pumping, the oxygen-containing products of this reaction are preferentially isotopically enriched in the heaviest $^{18}O$ isotope. This is because the common situation is to V-V pump the mixture in such a manner that the plateaus extend to high levels, with $E^{(2)}_a > 5.5$ eV. In the present invention, however, the extent of the plateaus is carefully controlled to create the situation in which $E^{(2)}_a < 5.5$ eV $< E^{(3)}_a$ (with ref. to FIG. 3). Under these conditions, the reaction products will be preferentially enriched in the middle mass, $^{17}O$ isotope.

Figure 4:
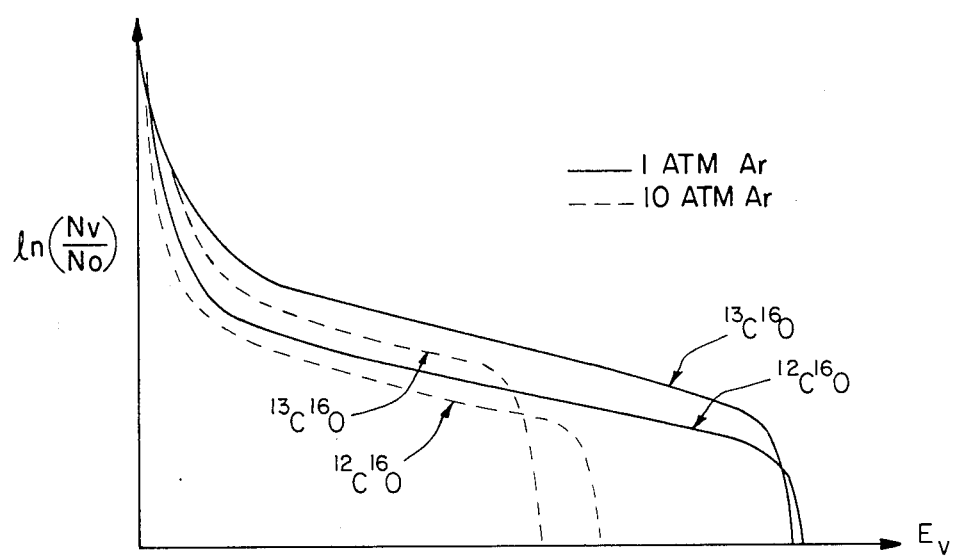
FIG. 4 is the vibrational population distribution functions for a system of $^{12}C^{16}O$ and $^{13}C^{16}O$ in argon.

The extent of the V-V pumped plateaus can be controlled through the addition of a diluent such that the higher vibrational distribution of the middle isotope and the activation energies of the enrichment reaction correspond. The disparities in extent of the V-V pumped plateaus among the various isotope species also become more marked as the V-T rates become larger, and the plateaus end at lower vibrational energies. FIG. 4 shows the qualitative behavior of the vibrational population distribution functions for a system of $^{12}C^{16}O$ and $^{13}C^{16}O$ in an argon diluent. The dashed curves are calculated for an argon diluent concentration of 10 atm., whereas the solid curves are for an argon concentration of 1 atm. The greater disparity in the plateau extents for the higher Ar concentration can be observed. This effect is caused by the fact that the difference in V-V rates for $^{12}C^{16}O$–$^{12}C^{16}O$ and for $^{13}C^{16}O$–$^{12}C^{16}O$ collisions becomes greater at lower vibrational energy, $E_v$. Thus, if the V-T rate is increased (by increasing Ar concentration in the example), causing plateaus to end at lower $E_v$ values, the disparity in the plateau extents becomes greater. The extent of the V-V pumped plateau in CO can also be controlled by He addition.

A preferred enrichment reaction is:

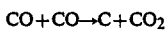

$$CO + CO \rightarrow C + CO_2$$

This reaction requires energies in the vibrational mode of the CO reactant equivalent to that of the $CO(a^3\pi)$ metastable, i.e., $E_v = 5.5$ eV, corresponding to $V \approx 27$ of the $X^1\Sigma^+/X^1\Sigma + CO$ ground state. A reaction with activation energies in this range is far below the maximum vibrational levels already V-V pumped in CO. Addition of He to cause the plateaus to end in this energy range should create a very marked disparity in the extent of the $^{12}C^{16}O$, $^{12}C^{17}O$, and $^{12}C^{18}O$ plateaus.

Above, the present invention is described with reference to the vibration-vibration enrichment of $^{17}O$ in a Co reactant mixture. Middle mass isotopes of light atoms other than O, such as C and C1, can also be enriched in accordance with the present invention; however, as the atomic mass of the isotopes increases, the effect diminishes. A wide variety of diatomic and small polyatomic reactant molecules can be used, including $CO_2$ and HCl, for these enrichments.

Having described the invention in detail and by reference to specific embodiments thereof, it will be apparent that numerous modifications and variations are possible without departure from the spirit and scope of the invention defined by the following claims.

What is claimed is:

1. A method of producing isotopically enriches material by vibration-vibration excitation of gaseous molecules in which at least one embodiment is present as first, second, and middle isotopes, said middle isotope having an atomic mass greater than said first isotope and less than said second isotope, wherein said method comprises:

vibrationally exciting said molecules while cooling said molecules to maintain a low translational mode temperature such that selected vibrational quantum levels of said molecules containing said middle mass isotope are preferentially populated;

combining a diluent gas with said gaseous mixture of isotopes and adjusting the concentration of said diluent gas to cause the middle isotope to be more abundant at the activation energy level than either said first or second isotopes;

chemically reacting said vibrationally excited molecules in a reaction which preferentially occurs at the vibrational quantum level at which the vibrational population of said molecules containing said middle isotope exceeds the vibrational populations of said molecules containing said first and second isotopes, a larger fraction of said molecules containing said middle isotope reacting than said molecules containing said first and second isotopes; and collecting the product of said reaction.

2. The method of claim 1 wherein said molecules are vibrationally excited by pumping by an optical laser.

3. The method of cliam 1 wherein said molecules are diatomic molecules.

4. The method of claim 1 wherein said chemical reaction involves dissociation of said molecules.

5. The method of claim 1 wherein said molecules are CO, or $CO_2$, or HCl

6. The method of claim 1 wherein said vibrational excitation is carried out by flowing a gaseous mixture of said molecules and a diluent through an irradiation zone whereby said molecules are cooled such that the translation mode temperature of said molecules is reduced.

7. The method of claim 2 wherein said molecules and the lasant species of said optical laser are the same.

8. The method of claim 7 wherein said molecules are an isotopic mixture of CO, said CO reacts and forms $CO_2$ which is enriched in $^{17}O$.

* * * * *